United States Patent [19]

Foster et al.

[11] Patent Number: 5,050,842

[45] Date of Patent: Sep. 24, 1991

[54] VALVE SEAL STRIP ORIFICE FITTING

[76] Inventors: James H. Foster, 5050 Ambassador Way, No. 301, Houston, Tex. 77056; John Beson, 10938 Leaning Ash, Houston, Tex. 77079

[21] Appl. No.: 650,081

[22] Filed: Feb. 4, 1991

[51] Int. Cl.$^5$ .............................................. F16K 3/02
[52] U.S. Cl. .................................... 251/176; 251/193
[58] Field of Search ............................... 251/176, 193

[56] References Cited

U.S. PATENT DOCUMENTS

| 1,548,634 | 8/1925 | Schiller | 251/176 X |
| 2,560,841 | 7/1951 | Bishop | 251/176 X |

Primary Examiner—John C. Fox
Attorney, Agent, or Firm—James E. Bradley

[57] ABSTRACT

An orifice fitting has a slide valve seal strip of increased sealing area. The orifice fitting has a body with an upper chamber and a lower chamber, separated by a slot. A plate carrier will move an orifice plate from the upper chamber, through the lower chamber, and down into a flow passage below the lower chamber. A slide valve carrier will open and close the slot between the upper and lower chambers. A seal strip locates on the slide valve carrier for sealing against the seat of the slot. The seal strip has on opposite sides a pair of outward extending flanges. Each flange overlies and contacts a shoulder formed on the upper side of the slide valve carrier. The seal strip has a lower section that locates within the shoulders.

7 Claims, 2 Drawing Sheets

VALVE SEAL STRIP ORIFICE FITTING

BACKGROUND OF THE INVENTION

1. FIELD OF THE INVENTION

This invention relates in general to orifice plate equipment for measuring fluid flow in pipelines, and in particular to a valve seal strip for sealing between the lower chamber and the upper chamber of an orifice fitting.

2. DESCRIPTION OF THE PRIOR ART

One method of measuring fluid flow in pipelines is by the use of an orifice fitting. An orifice fitting is an assembly that will be mounted to a pipeline for receiving fluid flow. It has a body with a passage for the flow of the fluid. The body has an upper chamber and a lower chamber separated by a slot. A gear mechanism will lower an orifice plate from the upper chamber, through the lower chamber and down into the fluid flow passage. The orifice plate has a hole through it. Fluid flow through the hole causes a pressure drop. The difference in pressure upstream and downstream of the plate corresponds to the volume of fluid flow.

While the orifice plate is in an inactive position in the upper chamber, and also while the orifice plate is in the active position in the flow passage, the slot between the upper and lower chambers must be sealed. This is handled by a slide valve carrier. The slide valve carrier has a metal seal strip mounted on its upper side. A gear mechanism will move the slide valve laterally, causing the seal strip to seal against the seat surrounding the slot. Springs urge the seal strip upward against the seat.

Grease injection passages extend from the upper chamber down through the seat. A groove surrounds the slot and communicates with the grease injection passages. A fitting will allow the introduction of grease to the groove around the slot to enhance sealing of the valve seal strip.

While this is workable, tolerances on the assembly are high. If moved too far in one direction, the seal strip may be misaligned with the grease injection grooves. This could expose pressure in the lower chamber to the grease injection fitting.

SUMMARY OF THE INVENTION

In this invention, the seal strip is constructed with flanges on each side and end. Each flange overlies one of the conventional supporting shoulders of the slide valve carrier. A lower section of the seal strip locates within the receptacle defined by the inward facing vertical walls of the shoulders of the slide valve carrier. This results in a general T-shaped configuration for the seal strip when viewed in a transverse cross section.

DETAILED DESCRIPTION OF THE INVENTION

Figure 1:
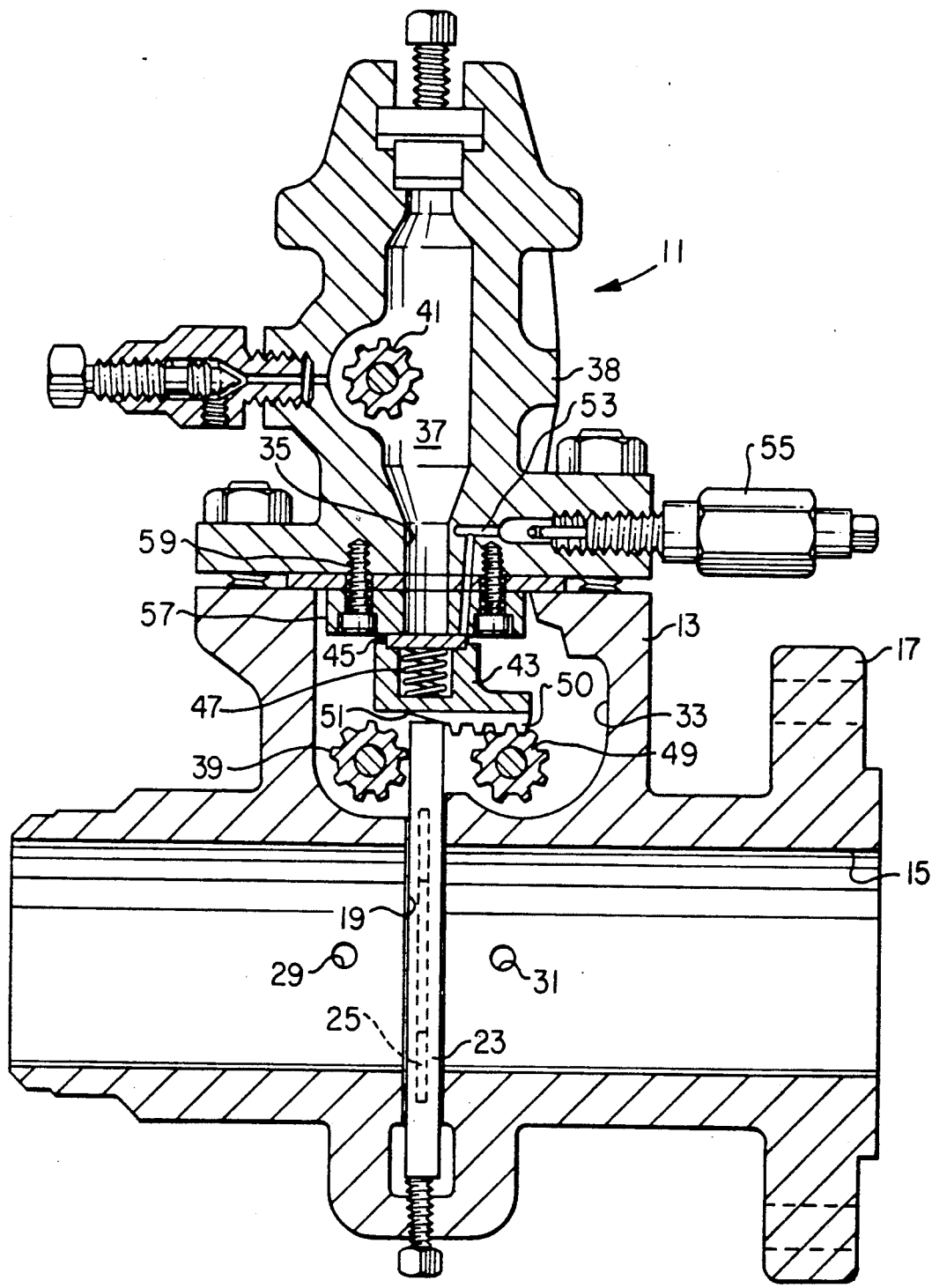
FIG. 1 is a vertical sectional view illustrating a prior art orifice fitting.

Referring to FIG. 1, prior art orifice fitting 11 is an assembly that includes a body 13. Body 13 has a flow passage 15 extending through it. Flange 17 will connect one side of the passage 15 to a pipeline. The other side of passage 15 will also be connected to a pipeline, through which fluid such as gas will flow.

A seat slot 19 locates in body 13 perpendicular to flow passage 15. A plate carrier 23 will locate in seat slot 19 when in the active position as shown in FIG. 1. Plate carrier 23 holds an orifice plate 25. Orifice plate 25 is a circular flat disk. It has a hole along the central axis of orifice plate 25.

Ports 29 and 31 will be located in the flow passage 15 upstream and downstream of the orifice plate 25. Measurement equipment (not shown) measures the pressure observed at the ports 29, 31 in order to determine the volume of the fluid flowing through the hole in the orifice plate 25.

Body 13 has a lower chamber 33 which locates above the flow passage 15. A slot 35 in the upper end of lower chamber 33 leads to an upper chamber 37. Upper chamber 37 is in an upper body section 38.

A gear 39 will connect to an external handle (not shown) for moving plate carrier 23 vertically, perpendicular to the axis of flow passage 15. Gear 39 engages teeth (not shown) formed on the edge of plate carrier 23. Gear 41, located in the upper chamber 37, will also engage plate carrier 23 when plate carrier 23 moves upward sufficiently. This enables plate carrier 23 to be removed from the top of the upper chamber 37. While in the upper chamber 37, plate carrier 23 will be in an inactive position.

A slide valve carrier 43 will move a slide valve seal strip 45 across slot 35. Seal strip 45 is urged upward by a plurality of coil springs 47. Seal strip 45 will seal the lower chamber 33 from the upper chamber 37. A gear 49 serves as means for moving the slide valve carrier 43 in a direction parallel with flow passage 15 and perpendicular to the direction of travel of the plate carrier 23. Slide valve carrier 43 will be in the closed position shown in FIG. 1 when the plate carrier 23 is in the active position shown in FIG. 1. Similarly, slide valve carrier 43 will be in the closed position shown in FIG. 1 when the plate carrier 23 is in the upper chamber 37.

Gear 49 is attached to a shaft which will lead to an external handle (not shown). Gear 49 engages teeth 50 on the lower side of slide valve carrier 43 to move it between the closed position in FIG. 1 and an open position (not shown) off to one side of slots 19, 35. The slide valve carrier 43 has a cam plate 51 on the bottom which will engage an upper edge of plate carrier 23 to retain plate carrier 23 in the lower or active position.

A grease injection passage 53 extends from upper body section 38 downward for supplying grease from a fitting 55 to the upper surface of seal strip 45. The grease injection passage 53 extends through a metal seat 57. Slot 35 also extends through seat 57, and seal strip 45 seals against the seat 57. Seat 57 secures by bolts 59 to the upper body section 38. Bolts 59 extend through holes in the seat 57.

In the prior art, seal strip 45 is a rectangular metal strip. It is elongated, having two parallel vertical sides and two parallel vertical ends. It locates within a receptacle on the upper end of slide valve carrier 43.

Note the close proximity of the side edge of seal strip 45 to the grease injection passage 53 when in the closed position. In the prior art, it is important that the lateral travel between the open and closed positions of slide valve carrier 43 be carefully controlled so as to assure that the seal strip 45 does not extend out of alignment with the injection passage 53.

Figure 2:
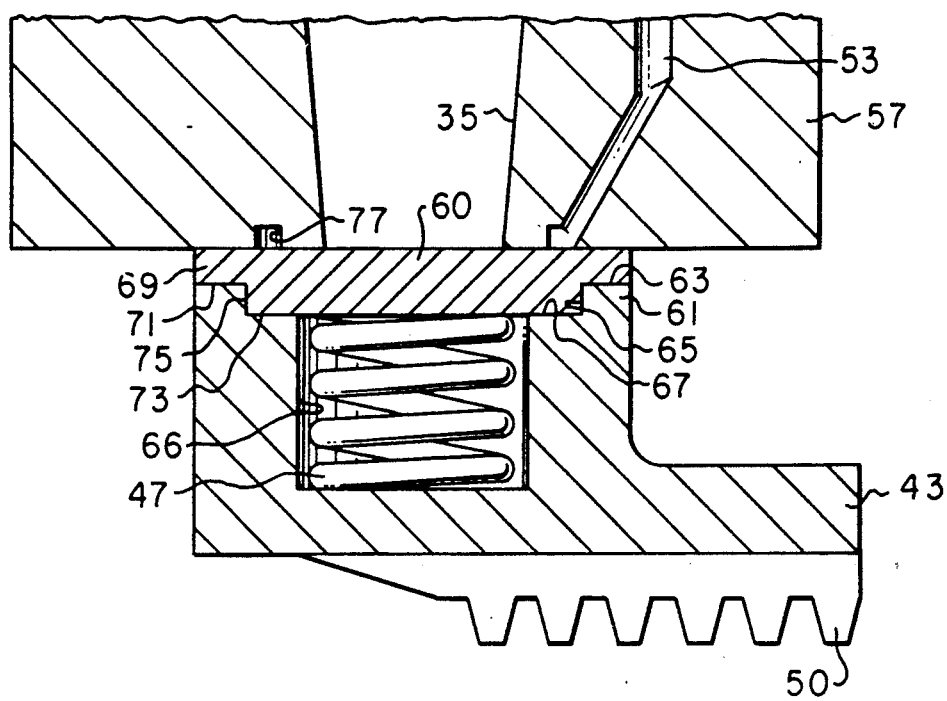
FIG. 2 is a view of a slide valve carrier and seal strip constructed in accordance with this invention.

FIG. 2 illustrates an improved seal strip 60. The remaining elements of the orifice fitting 11 as shown in FIG. 1 are the same, and will be shown by the same numerals. Seal strip 60 replaces the prior art seal strip 45 without modification to any of the other structure shown in FIG. 1.

The slide valve carrier 43 has spaced apart, parallel upper shoulders 61 on each side. Shoulders 61 are straight and elongated. Each shoulder 61 has an upper surface 63 that faces upward. Each shoulder 61 has a vertical wall 65. The vertical walls 65 face inward toward each other and are perpendicular to the upper surfaces 63. A flat horizontal base 67 extends across the lower edges of the vertical wall 65. A plurality of cylindrical cavities 66 extend downward from base 67 for receiving springs 47.

Figure 3:
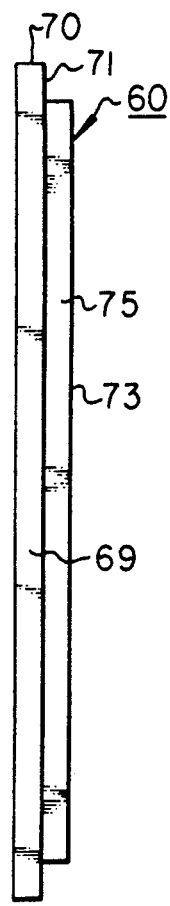
FIG. 3 is a side view of the seal strip shown in FIG. 2, with the seal strip shown vertically oriented.
Figure 4:
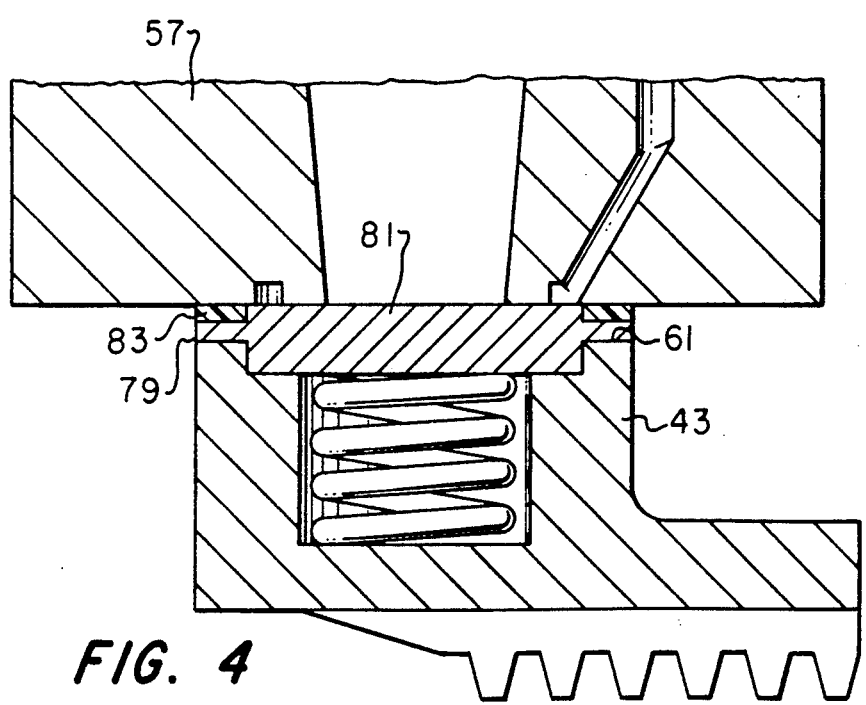
FIG. 4 is a cross sectional view of an alternate embodiment of the slide valve carrier and seal strip shown in FIG. 2.

Seal strip 60 differs in that it has two side flanges 69 and two end flanges 70 (FIG. 3). In the embodiment of FIG. 2, flanges 69, 70 are integrally formed with seal strip 60. Each flange 69, 70 extends outward from the body of seal strip 60. Each flange 69, 70 has an upper surface that is in a common plane with the upper surface of seal strip 60. Each flange 69, 70 has a lower side 71. The lower sides 71 of side flanges 69 rest on the upper surfaces 63 of the slide valve carrier shoulders 61.

The flanges 69, 70 define a lower section 73 of the seal strip 60 that extends below the flanges 69, 70. Lower section 73 has vertical walls 75 on each side and end. The walls 75 on the sides mate with the side walls 65 of slide valve carrier 43. Flanges 69 result in a general "T" shape cross section when viewed as shown in FIG. 2. The area of the lower surface of lower section 73 is the same as the area of the upper and lower surfaces of the prior art seal strip 45 (FIG. 1). The area of the upper surface of seal strip 60 is greater than the area of the lower surface of the lower section 73. The width and length of the upper surface of seal strip 60 is greater than the width and length of the lower section 73. The lower section 73 rests on the base 67. The springs 47 contact the lower side of the lower section 73 to push it upward.

Although not shown in FIG. 1, the prior art seat 57 has a grease injection groove 77. The grease injection groove 77 extends along each side of the slot 35 and along each end, forming a closed rectangular loop. The grease injection passage 53 leads to the grease injection groove 77.

In the operation of the embodiment of FIG. 2, gears 49 will move the slide valve carrier 43 from an offset position into the position shown in FIG. 2. The upper surface of seal strip 60 will slide across the seat 57, sealing the slot 35. Grease may be injected into the grooves 77 to enhance sealing of the seal strip 60 against the seat 57. It is possible that a portion of one or more of the side flanges 69 will locate partially under one of the holes for the bolts 59 (FIG. 1). This will not affect sealing as long as the seal strip 60 fully covers the grease injection groove 77.

In the embodiment of FIG. 3, the flanges 79 of seal strip 81 have the same surface area as the flanges 69, 70. However, flanges 79 have recessed sections lower than the upper surface of seal strip 81. Each flange 79 includes a gasket 83 of a non-metallic or elastomeric material which locates in the recess. The upper surface of gasket 83 protrudes slightly above the upper surface of seal strip 81.

When moved to the closed position, the contact of gasket 83 with seat 57 deforms the gasket 83 for sealing. The upper surface of gasket 83 will be flush with the upper surface of seal strip 81 when in the closed position. The gasket 83 will be bonded to the metal portion of flanges 79. Flanges 79 will overlie the shoulders 61 of slide valve carrier 43.

The invention has significant advantages. The flanges on each side and end increase the width and length of the seal strip. This provides a greater surface area for sealing. The greater surface area reduces the chance of the seal strip being moved out of alignment with the grease injection grooves. This reduces the need for high tolerances for the mechanism.

While the invention has been shown in only two of its forms, it should be apparent to those skilled in the art that it is not so limited, but is susceptible to various changes without departing from the scope of the invention.

We claim:

1. In an orifice fitting of the type having a body with an upper chamber, a lower chamber and a slot between the upper and lower chambers, an improved means for sealing against a seat surrounding the slot, comprising in combination:

a slide valve carrier having an upper side containing a pair of spaced apart parallel shoulders, defining a rectangular receptacle;

a seal strip having an upper surface for sealing against the seat, the seal strip having on opposite sides a pair of outward extending flanges, each of which overlies one of the shoulders of the slide valve carrier, the flanges having upper surfaces for sealing against the seat, the seal strip having a lower section located below each flange for reception between the shoulders of the receptacle;

at least one spring mounted between the slide valve carrier and contacting the lower section of the seal strip for urging the seal strip tightly against the seat; and means for moving the slide valve carrier between open and closed positions transverse to the movement of the plate carrier to open and close the slot.

2. The orifice fitting according to claim 1 wherein the flanges are metal.

3. The orifice fitting according to claim 1 wherein the upper surface of each of the flanges is non-metallic for sealing against the seat.

4. In an orifice fitting of the type having a body with an upper chamber, a lower chamber, and a slot between the upper and lower chambers, an improved means for sealing against a seat surrounding the slot, comprising in combination:

a slide valve carrier having an upper side containing a pair of spaced apart parallel shoulders, each of the shoulders having a vertical wall that opposes and faces inward toward the other, each of the shoulders having an upward facing horizontal surface, the horizontal surfaces being in a common plane;

a metal seal strip having an upper surface for sealing against the seat, the seal strip having on opposite sides a pair of downward facing horizontal surfaces, each of which overlies and contacts one of the upward facing horizontal surfaces of the shoulders of the slide valve carrier, the seal strip having a lower section located between the downward facing horizontal surfaces that is defined by a pair of outward facing vertical surfaces, each of the vertical surfaces mating with one of the vertical walls of the shoulders;

at least one spring mounted between the slide valve carrier and contacting the lower section of the seal strip for urging the seal strip tightly against the seat; and means for moving the slide valve carrier between open and closed positions transverse to the movement of the plate carrier to open and close the slot.

5. The orifice fitting according to claim 4, further comprising a elastomeric member located on the upper surface of the seal strip for sealing against the seat.

6. In an orifice fitting of the type having a body with an upper chamber, a lower chamber, and a flow passage located below the lower chamber for connecting into a pipeline, a slot between the upper and lower chambers, an orifice seat located in the flow passage, a plate carrier which carries an orifice plate having a hole therethrough for the passage of a fluid, means for moving the plate carrier from an inactive position within the upper chamber to an active position in engagement with the orifice seat and with the orifice plate in the flow passage, an improved means for sealing the slot, comprising in combination:

a slide valve carrier having an upper side containing a pair of spaced apart elongated parallel shoulders, each of the shoulders having a vertical wall that opposes and faces inward toward the other, each of the shoulders having an upward facing horizontal surface, the horizontal surfaces being in a common plane;

a seal strip having a lower section and an upper section with a smooth upper surface for sealing against the slot, the lower section being located between the vertical walls of the shoulders to retain the seal strip with the slide valve carrier, the upper section having a transverse width that is greater than the transverse width of the lower section and greater than the transverse distance between the shoulders, with a portion of the upper section overlying the shoulders to increase sealing area;

at least one spring mounted between the slide valve carrier and contacting the lower section of the seal strip for urging the seal strip tightly against the slot; and means for moving the slide valve carrier between open and closed positions transverse to the movement of the plate carrier to open and close the slot.

7. The orifice fitting according to claim 6, wherein the upper section has a length that is greater than the length of the lower section.

* * * * *